United States Patent [19]

Sterzer

[11] Patent Number: 4,490,668

[45] Date of Patent: Dec. 25, 1984

[54] MICROWAVE RADIATOR UTILIZING SOLAR ENERGY

[75] Inventor: Fred Sterzer, Princeton, N.J.

[73] Assignee: RCA Corporation, New York, N.Y.

[21] Appl. No.: 57,109

[22] Filed: Jul. 12, 1979

[51] Int. Cl.³ .......................................... H02M 7/00
[52] U.S. Cl. .................................. 322/2 R; 290/1 R; 244/159; 244/179; 343/708
[58] Field of Search ...................... 322/2; 290/1, 52; 455/25; 244/158, 159, 179; 343/708, DIG. 2

[56] References Cited

U.S. PATENT DOCUMENTS 3,390,333  6/1968  Klawsnik et al. .................. 455/25
3,933,323  1/1976  Dudley et al. ...................... 322/2 R
3,989,994  11/1976  Brown .

OTHER PUBLICATIONS

A Search for Space Energy Alternatives by Gilbreath and Billman, *Third NASA Conf. on Radiation Energy Conversion* Jan. 26-28, 1978, pp. 107-125.
"Solar Power Satellite Studied" *Aviation Week & Space Technology*, by Craig Covault, Jan. 22, 1979 pp. 14-15.
Shuttle Power Package Being Developed by Craig Covault, *Aviation Week & Space Technology*, Mar. 26, 1979 pp. 43-45.
Analysis of S-Band Solid-State Transmitters for Solar Power Satellite by E. F. Belohoubek et al., pp. 32-36, 6/1/79.
William R. Cherry, "A Concept for Generating Commercial Electrical Power from Sunlight," *8th IEEE Proceedings*, Seattle, Washington, Aug. 4-6 1970, pp. 331-337.
Peter E. Glaser, "Satellite Solar Power Station," *The Journal of Solar Energy and Technology*, vol. 12, No. 3, p. 353.

*Primary Examiner*—R. J. Hickey
*Attorney, Agent, or Firm*—Samuel Cohen; Joseph D. Lazar; Robert L. Troike

[57] ABSTRACT

A space-oriented apparatus for converting solar energy to microwave energy. The microwave energy is used to generate an RF beam for propagation to the earth. The apparatus is formed into an extended planar sandwich-like structure carrying solar cells on one surface facing the sun and microwave devices on the other face for generating the RF beam. The microwave devices are energized by the solar cells, and function to generate the RF energy. The apparatus is useful for converting solar energy to microwave power, and to operate communication satellites and satellites having radar functions.

6 Claims, 11 Drawing Figures

MICROWAVE RADIATOR UTILIZING SOLAR ENERGY

This invention relates to generating microwave energy utilizing solar energy. It is applicable, for example, to solar power satellites and other spaceborne systems.

Satellite systems lend themselves to the use of solar energy for energizing microwave communication systems. It has been proposed in an orbiting spacecraft to generate from solar energy, microwave power signals to be transmitted to ground-based receiver stations. Various proposals include converting solar energy to d.c. power from a plurality of individual solar cells and combining the outputs of the cells to provide d.c. power. The combined d.c. power is utilized to develop the microwave signals by the use of high power electron tubes. It has been further proposed to utilize solid-state technology to replace the electron tubes for generating microwave signals.

These proposals depend upon developing high levels of d.c. power and concentrating the resultant microwave signals to an array of antennas. Furthermore, coupling the d.c. signals from the solar array panels to the microwave devices involves coupling large voltages through rotating mechanical devices such as a rotating joint in the typical rotating solar array system.

Rotary joints coupling the d.c. power from the solar array to microwave devices present service reliability problems. Furthermore, combining the d.c. power and converting it into a single microwave beam for transmission to the earth requires final output microwave stages and associated support structure capable of handling significantly large microwave power.

There is a need for a solar energy-to-microwave energy generating system that obviates the problems of the proposed schemes outlined above. Such systems are needed not only for generating power directly, but also to power communication, radar and military satellites.

According to the present invention, a sandwich structure formed of a planar support member carries a plurality of array modules, each array comprising an array of solar cells on one face of the member and a radio frequency (RF) module on the other face. Solar energy is converted by the solar cells to d.c. power which is coupled directly to the RF module through the support member. The RF module comprising an RF amplifier and an antenna, energized by the d.c. power, generates an RF signal for radiation by the antenna in the form of a directional beam such as one pointed towards the earth. A plurality of such beams are combined into a single beam by suitable phasing of the individual beams from the respective array modules.

Figure 1:
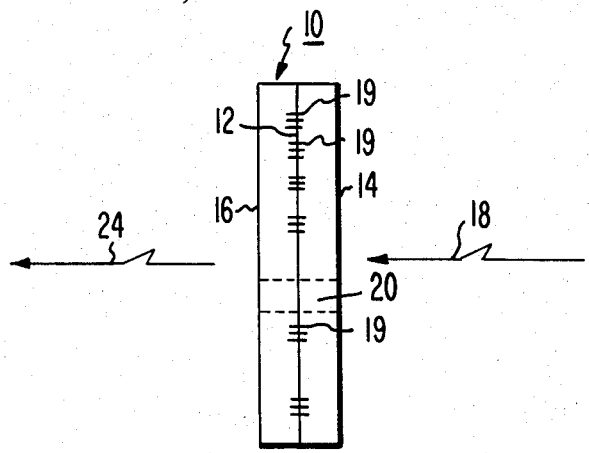
FIG. 1 is a side view of the solar energy-to-microwave energy converter according to the invention.
Figure 2:
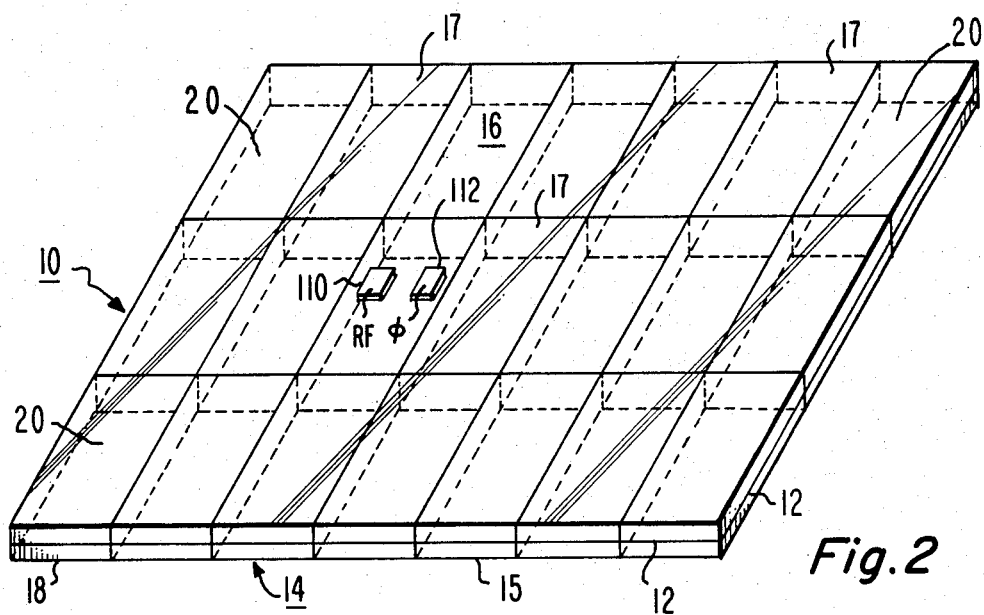
FIG. 2 is an isometric view of the converter shown in FIG. 1.

Referring to FIGS. 1 and 2, there is shown in a side view and a perspective plan view, respectively, a solar energy-to-microwave converter structure 10 formed of a common support member 12 supporting a converter array formed of a plurality of individual solar energy-to-microwave energy converter modules 20. Each module 20 is, in general, a discrete module functioning independently of the other modules 20. The modules are formed on the support member 12 and arranged in a compact array. Each converter module 20 carries a solar cell module 15 on one face of the common support member 12 and a microwave module 17 on the opposite surface of the support member 12. Module 15 comprises a plurality of solar cells 13 interconnected by wires 13a shown in detail in FIG. 3. The converter structure 10 is thus formed generally of a support member 12 carrying on one face a solar cell array 14 comprising a plurality of solar cells 15. The individual solar cells are of known type suitably made of silicon or gallium arsenide. Known types typically generate 0.5 volts, and when suitably connected in series, generate sufficient power to operate microwave devices.

On the opposite surface of the support member 12 is a microwave module array 16 of microwave modules 17 to be described. Each converter module 20 of the structure 10 functions to convert sunlight energy-to-microwave energy individually and independently (except for phasing as will be explained) of all of the other respective modules 20 of the module array of structure 10. The reasons for providing individual modules 20 and generating microwave signals 24 from the sunlight 18 will be explained in detail hereinafter.

In operation, sunlight 18 impinges upon the solar cell array 14 generating d.c. power therefrom in a known manner. The d.c. power from the solar cell array 14 is coupled by a group of three direct current (d.c.) feed lines 19 (comprising wires 38, 39 and 40) from each solar cell module 15 to the respective and associated microwave module 17 which, in turn, generates a microwave beam 24. The direction of the beam 24 is controlled by the phase of the signal generated by the module 17 relative to the respective other beams 24 in a manner as will be described in further detail hereinafter.

Figure 3:
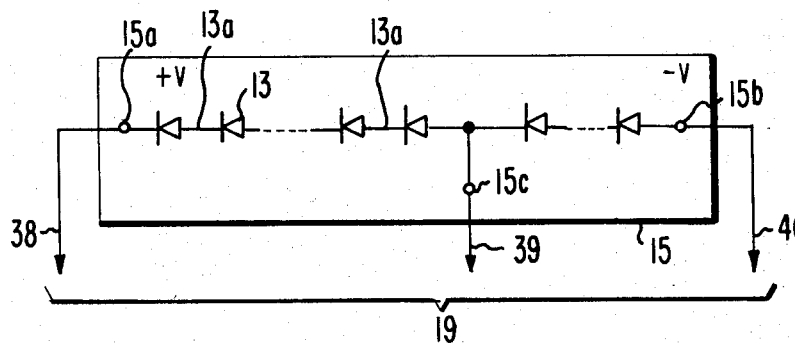
FIG. 3 is a schematic of one solar cell module (15)

FIG. 3 illustrates the manner in which a plurality of solar cell diodes 13 are connected to provide the d.c. power source for the microwave array. Solar cell module 15 is arranged such that the diodes 13 are connected serially, end to end by leads 13a, to provide a plus voltage source at terminal 15a which is coupled to conductor 38 for connection to the associated microwave module 17. A negative source of voltage is provided at terminal 15b for connection to conductor 40 and terminal 15c, coupled from within the serial arrangement of diodes 13, is connected to conductor 39 to provide the reference ground for the associated module 17. Thus, each lead 39 provides the positive voltage supplies for the associated module 17 while each lead 40 provides the bias voltage for its associated module 17.

Figure 4:
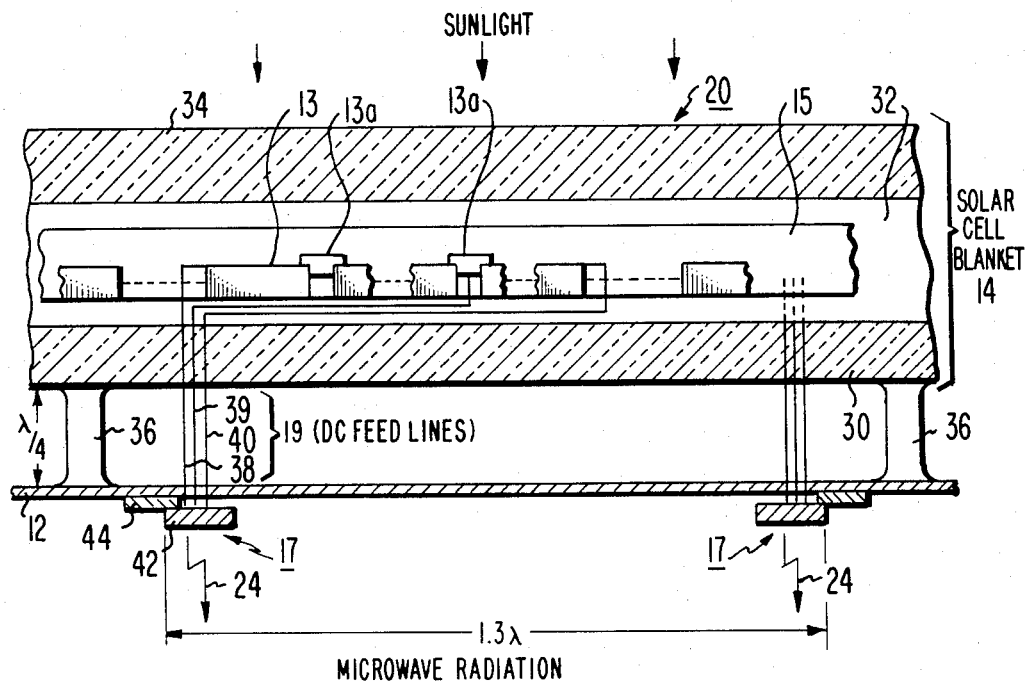
FIG. 4 is an end view, partly in section of a fragmentary portion of the converter shown in FIGS. 1 and 2.

FIG. 4 shows in a side view, partly in section, two adjacent array modules 20 of the structure 10. Each module 20, which may be spaced or separated from the other modules 20, is supported on the common support member 12 of a plastic sheet. Within each module 20, the layer 32 represents a group of series-connected solar cells 13 within module 15 as shown in FIG. 3. Each group of such cells is part of a blanket structure, the cells being sandwiched between a continuous glass substrate 30 and a continuous transparent cell cover 34 formed suitably of glass.

Each solar cell module 15 may be physically spaced from the adjacent modules 15 if design requirements dictate it. The present state of the art provides the means to have the entire array 32 of cells 13 closely spaced, each module (15) formed therefrom by suitable printed circuit wiring.

Solar cell blanket 14 may be supported on support member 12 by means of suitable plastic brackets 36. However, the structural form of the three d.c. feed lines 19 (38, 39, 40) may be sufficient to support the blanket 14 and sheet 12. The spacing between the bottom surface 31 of substrate 30 and member 12 is one-quarter wavelength of the signal frequency of microwave beam 24. In this way the blanket 14 with an appropriate metalized surface will serve as a back plane reflector of the antenna (44) signals.

A microwave module 17 is attached to the bottom surface 13 of the support member 12. Module 17 includes a chip 42 comprising an RF amplifier (shown in more detail in FIGS. 8 and 9) and a dipole antenna 44. Each antenna 44 of the respective and adjacent converter modules 20 is suitably spaced from the others by a distance, for example, of 1.3 wavelengths of the RF signal frequency (e.g. −2.4 GHz).

Figure 5:
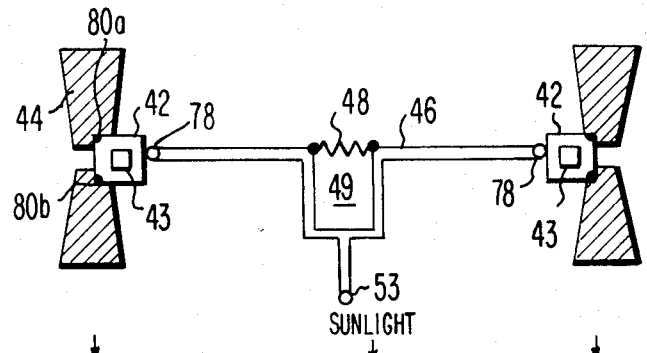
FIG. 5 is a schematic of one form of the antenna and amplifier used in the converters shown in FIG. 3.
Figure 9:
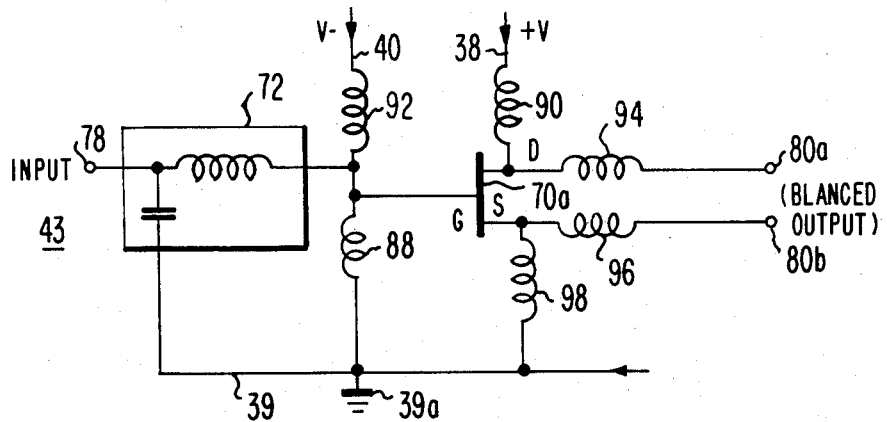
FIG. 9 is a schematic of a double-ended amplifier preferably used for the RF modules.

The schematic of FIG. 5 shows the antenna 44 of FIG. 4 coupled directly to a chip 42 including a push-pull amplifier 43 (FIG 9). A transmission line 46 and a terminating resistor 48 are coupled to a balanced line power splitter 49 which splits the power from a phase-controlled signal coupled to terminal 53 via the network 60 shown in FIG. 10 to be described.

Figure 8:
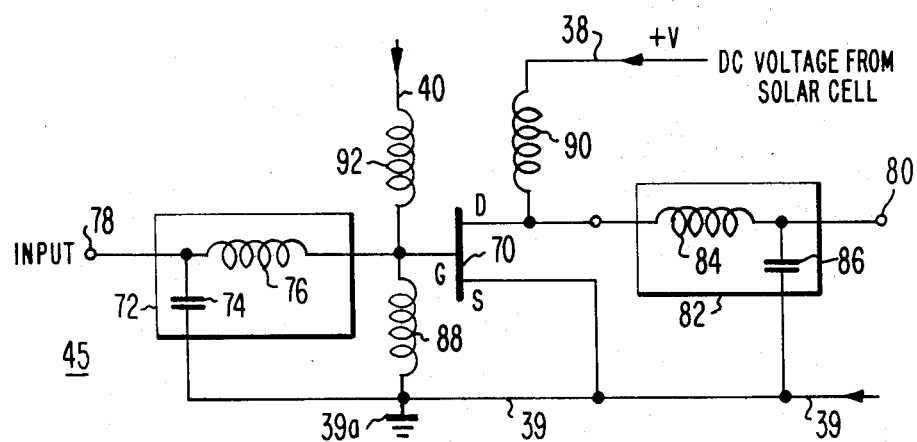
FIG. 8 is a schematic of an amplifier for use in the RF modules.

FIG. 8 illustrates a suitable field effect transistor arranged in circuit to provide an amplifier 45 for exciting the antennas from which a microwave beam 24 (FIG. 1) is launched. The amplifier comprises a gallium arsenide FET 70 having gate, drain and source terminals. An input network 72 is formed of a capacitor 74 and an inductor 76, the latter being coupled between the gate and input terminal 78, and the capacitor being coupled between ground 39a and the input terminal 78. The drain is coupled to the output terminal 80 through a network 82 comprising an inductor 84 and a capacitor 86 shunted to ground 39a. A shunting coil 88 is coupled between the gate and ground 39a. The reference ground 39a is provided by lead 39 coupled to the diode module 15 (FIG. 3). Positive voltage (+V) is provided to FET 70 via lead 38 and choke coil 90. The bias (−V) for FET 70 is provided by lead 40 through RF choke 92.

The d.c. feed lines 38, 39 and 40 are the ones supplying directly the operating voltages produced by the solar cell module 15 connected to amplifier 45. These lines correspond to the lines 19 of FIGS. 1 and 4.

Figure 10:
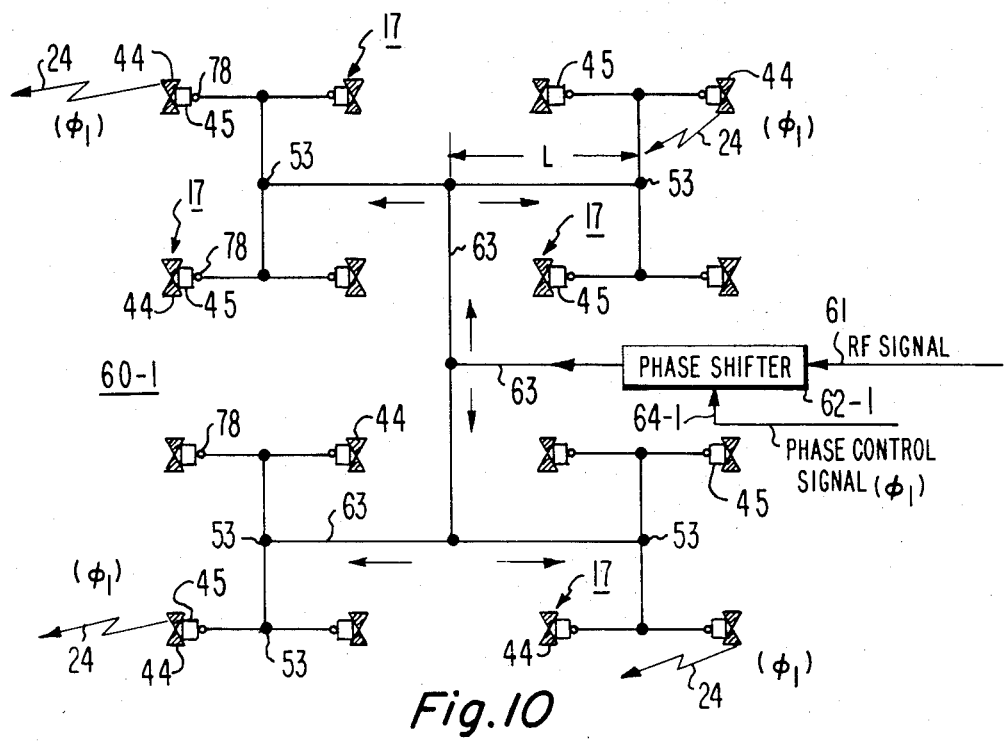
FIG. 10 is a schematic of a network for distributing the RF signals to a group of microwave modules.

In the operation of the amplifier of FIG. 8, an RF signal from an RF signal source common to the entire system (110, FIG. 11) after being phase shifted by a phase shifter 62-j (not shown in FIG. 8) is applied to input terminal 78. In practice, this j'th phase shifter may be common to a group of modules as shown in FIG. 10 where the phase shifted RF signal drives sixteen amplifiers such as 45. The RF signal is amplified by the circuit to produce an amplified signal at terminal 80 which is applied to an antenna (not shown in FIG. 8, but discussed and illustrated later). As shown in FIG. 10, the signals from sixteen amplifiers 45 are applied to sixteen antennas each generating beam 24 and they produce together a common phased beam 25 (see FIG. 11) of RF energy which is radiated toward the earth.

Referring now to FIG. 9, there is shown an amplifier 43 arranged as a push-pull amplifier having a balanced output. Amplifier 43 is formed of FET 70a having an input circuit similar to that of FIG. 8. The d.c. power is provided to the amplifier by feed lines 38, 39 and 40 in a similar manner as FIG. 8. Balanced output is derived via output loading coils 94 and 96, respectively, coupled to output terminals 80a and 80b. An RF choke 98 isolates the source from RF ground and yet allows for d.c. ground 39a coupled via path 39 to module 15 (FIG. 3).

Push-pull or double-ended amplifier 43 is preferably mounted on a sapphire substrate, typically 0.5×1 cm. utilizing what are known as "bump-mounted" GaAs FETs for the active amplifier devices. Aside from the double-ended operation, the amplifier of FIG. 9 operates in the system in a manner similar to that discussed for FIG. 8.

Figure 6:
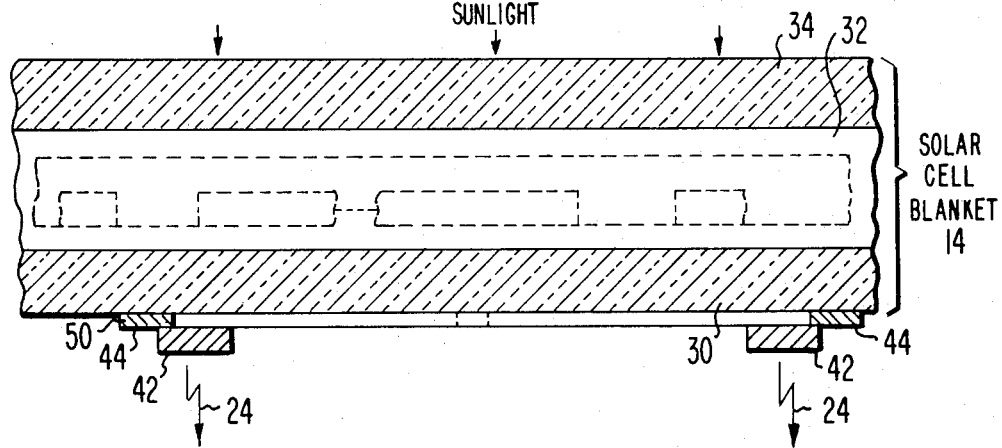
FIG. 6 is a modification of a converter module according to the invention.

A modified converter module 20a is shown in FIG. 6. In this embodiment, solar blanket 14 comprises a glass substrate 30, solar cells 32 and a cell cover 34. Supports 50 formed preferably of plastic are attached to the glass structure 30 to support the microwave chip 42. Antenna 44 is printed on the surface of support 50 and connected to an amplifier such as an amplifier 45 described hereinabove.

Figure 7:
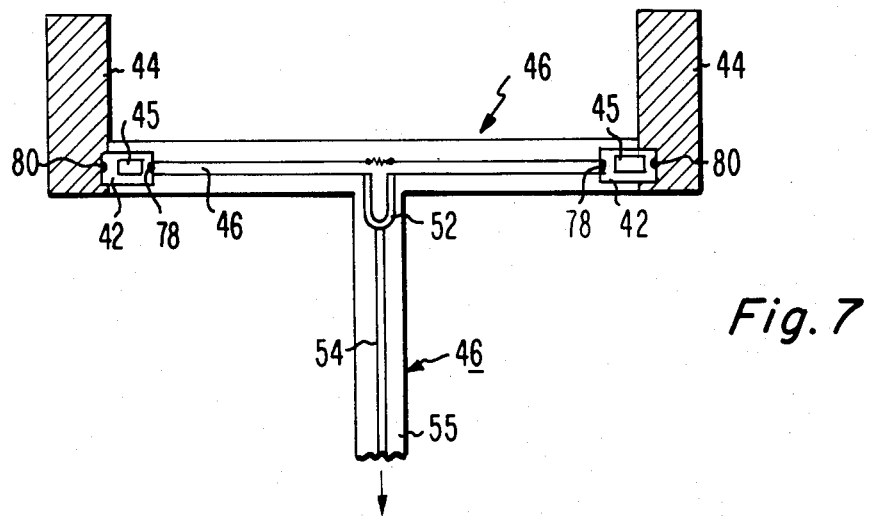
FIG. 7 is a schematic of another form of the antenna and amplifier used in the module of FIG. 6.

Referring to FIG. 7, there is shown a schematic of the arrangement of the antenna 44 and the amplifier chip 42 carrying single output amplifier 45. Antenna 44 is formed from a strip of transmission line printed on support 50. Antenna 44 is connected to amplifier 45 (via terminal 80) which, in turn, is coupled to a transmission line network 46 (via terminal 78). Antenna 44 is preferably a patch resonator. Transmission line 46 serving as a power splitter is preferably a stripline type having a conductor 54, and ground plane substrate 55.

FIG. 10 illustrates a distribution network by which an RF signal is coupled to a plurality of microwave modules 17 forming a subarray 60-1 from which sixteen RF beams 24 are generated at a given phase ($\phi_1$). The RF signal is coupled to the subarray 60-1 via bus 61 through a phase shifter 62-1 and a plurality of transmission lines 63, each of the same electrical length to provide uniform power distribution. The length L of each section is related to the wavelength of the RF signal and may assume any suitable value such as 1.3 times the wavelength. A phase control signal via lead 64-1 is coupled to the phase shifter 62-1.

Figure 11:
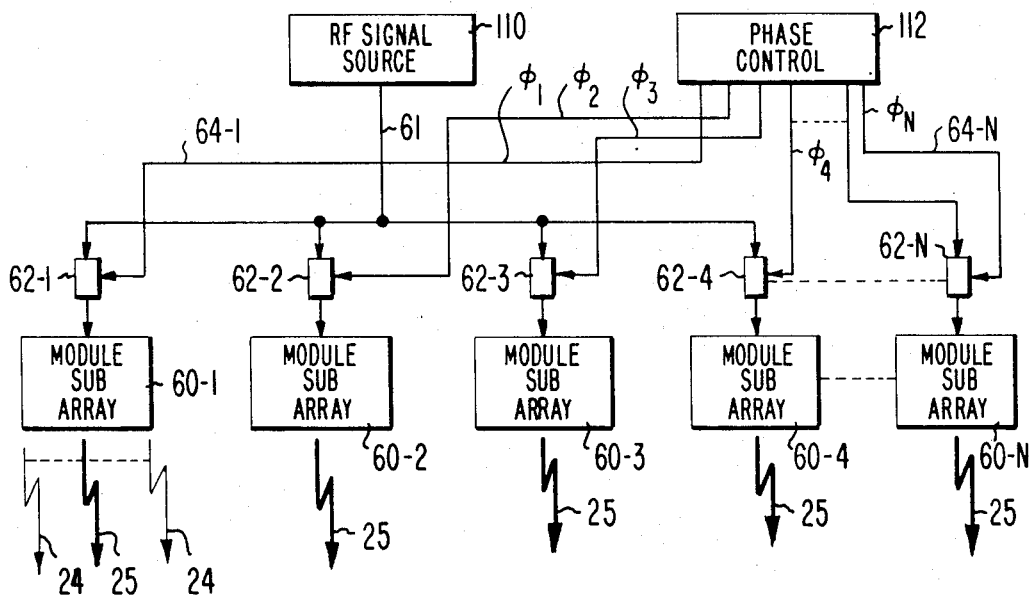
FIG. 11 is a schematic of the system array for controlling the phase or direction of microwave beams 24 for each group of subarray of the microwave modules.

Referring now to FIG. 11 there is shown the organization of the entire array providing sixteen microwave beams 24 each from the respective subarrays at phases $\phi_1 - \phi_N$. The radio frequency signal (e.g. 1–10 GHz) is generated by a suitable RF generator 110 which is coupled to the respective subarrays by a bus 61 of suitable microwave transmission lines similar to that described above in connection with FIG. 10. The phase for each of the respective subarrays is provided by a phase control circuit 112 coupled to the respective phase shifters (62-1 to 62-N) via control leads 64-1 to 64-N to provide the desired phase $\phi_1-\phi_N$ for each subarray 60-1 to 60-N. Phase control 112 is formed of suitable logic circuits to generate a control signal for controlling each phase shifter (62-1 to 62-N) of any suitable form well known in the art. The radio frequency referrence source 110 is of any suitable form well known in the art suitably located on the array. It is powered by the d.c. power from the solar cells 13 in a similar manner as described above for the amplifiers 43 and 45 (FIGS. 8 and 9).

In practicing the invention, the energy converter operating in orbit on board a suitable space vehicle may be arranged to be self-contained to operate independently of ground control. In such an arrangement the phase control 112 would be programmed to effect a desired control of the plurality of RF beams 25 (each beam 25 comprising sixteen individual beams 24) to be converged at or near a certain location on the surface of the earth for collection by a suitable antenna or antenna array.

If desired, the invention may be practiced by having ground control signal linkages to the system to control the phase of the respective beams according to a desired arrangement which can be arranged from time to time, as desired. Various other arrangements for practicing the invention will be apparent to those skilled in the art. Furthermore, the energy conversion principle is useful in powering communication and radar satellites. Thus in systems other than for generating a plurality of RF beams serving to carry high energy levels of microwave power to the earth, the beam may be serving to carry communication signals or be serving as radar interrogation signals. Each module (60-j, FIG. 11) or group of modules can be arranged to provide a set of beams 24, each set phased to be directed in a desired direction. The energy for such beams in such systems are nevertheless provided by the solar cells coupled to the respective beam generating devices in a similar manner as the embodiments described above.

It should be understood that the solar energy converter 20, while being supported in orbit by the vehicle spacecraft, is preferably oriented to face the sun as much as possible to effect an efficient utilization of solar energy.

What is claimed is:

1. A space-oriented apparatus for converting solar electromagnetic energy to microwave radiation, said apparatus comprising:

source means for generating microwave radio frequency (RF) signals;

a plurality of energy converting modules formed as an array on a support structure, each module comprising:

a plurality of solar cells arranged in a group to form an array to generate direct current power;

microwave signal amplifying means coupled to said source means and being responsive to said RF signals for amplifying said RF signals;

direct coupling means for energizing, with said direct current power from said group of solar cells, said amplifying means; and antenna means coupled to said microwave signal amplifying means so that each one of said modules includes a separate one of said microwave signal amplifying means for each of said antenna means each antenna means being responsive to said RF amplified signals to radiate a radio frequency (RF) beam into space, said apparatus being formed on said support structure in a generally extended plane, one face of said structure carrying said solar cells of each of said modules and the other opposite face of said structure carrying said microwave signal amplifying means and said antenna means, said apparatus when in operating position in space having said antennas disposed to face a desired direction and arranged to propagate said RF beam in said desired direction.

2. In the apparatus recited in claim 1 further including means for controlling the phase of said RF signal so that the direction of propagation of said RF beam from said antenna means is directed in a predetermined direction.

3. In the apparatus of claim 1, said microwave signal amplifying means being arranged in a network comprising transmission lines for dividing power equally to each of said microwave signal amplifying means.

4. In the apparatus recited in claim 3 further including phase shifting means for controlling the phase of each of said RF signals to provide a group of said RF beams from said antennas having the same phase.

5. In the apparatus recited in claim 4 wherein said phase shifting means includes a plurality of phase shifters, each one of said plurality of phase shifters being coupled to a respective one of said microwave amplifying means and further includes a phase control logic means for generating a plurality of control signals, each control signal for controlling a respective one of said phase shifters.

6. In the apparatus of claim 5 further including a plurality of said networks, said RF source signal being coupled to each network, and wherein said phase control means provides a control signal to the respective phase shifters to selectively control the phase of each of said networks.

* * * * *